US006477481B1

(12) United States Patent
Umeno

(10) Patent No.: US 6,477,481 B1
(45) Date of Patent: Nov. 5, 2002

(54) DEVICE AND METHOD FOR OUTPUTTING STOCHASTIC PROCESSES, AND DATA RECORDING MEDIUM

(75) Inventor: Ken Umeno, c/o Communications Research Laboratory, Ministry of Posts and Telecommunications, 2-1, Nukuikitamachi 4-chome, Koganei-shi, Tokyo, 184-8795 (JP)

(73) Assignees: Communications Research Laboratory, Ministry of Posts and Telecommunications, Koganei (JP); Ken Umeno, Koganei (JP)

( * ) Notice: Subject to any disclaimer, the term of this patent is extended or adjusted under 35 U.S.C. 154(b) by 0 days.

(21) Appl. No.: 09/559,444

(22) Filed: Apr. 27, 2000

(30) Foreign Application Priority Data

Apr. 28, 1999 (JP) .............................. 11-122361

(51) Int. Cl.[7] ....................... G06F 101/14; G06F 15/00; G06F 17/18
(52) U.S. Cl. ...................... 702/179; 702/181; 702/183; 703/11
(58) Field of Search ............................... 702/116, 179, 702/181, 182, 183; 703/2, 11

(56) References Cited

U.S. PATENT DOCUMENTS 5,285,395 A * 2/1994 Kamayashi ................ 702/181
5,914,891 A * 6/1999 McAdams et al. ............ 703/11
6,202,038 B1 * 3/2001 Wegerich et al. ........... 702/183

OTHER PUBLICATIONS

Mantegna & Stanley, "Scaling Behavior in the Dynamic of an Economic Index," *Nature*, pp. 46–49 (Jul. 6, 1995).
Gnedenko and Kolmogorov, "Limit Distributions For Sums of Independent Random Variables" pp. iii, iv, forward page and 170–183 (dated 1954, 1968, including forward dated 1967).
Umeno, "Superposition of Chaotic Processes With Convergence to Levy's Stable Law," *Physical Review E*, v. 58, No. 2 (Aug. 1998).

* cited by examiner

*Primary Examiner*—John S. Hilten
*Assistant Examiner*—John Le
(74) *Attorney, Agent, or Firm*—Luce, Forward, Hamilton & Scripps LLP

(57) ABSTRACT

A device for outputting stochastic process according to the present invention comprises a plurality of random variable output units, a normalizing unit, and a result output unit. Each of the random variable output units outputs a sequence of random variables whose limiting distribution obeys an explicit density function. The normalizing unit normalizes the sum of the random variables in the same row over the random variable sequences output by the random variable output units, and sequentially outputs the normalized values. The result output unit integrates the values sequentially output by the normalizing unit, and sequentially outputs the integrated values as result values in stochastic process. The random variable output units utilize a recurrence formula obtained by an addition formula of a tangent function, thus, efficient high speed simulation of the Lévy's stable processes is realized.

56 Claims, 10 Drawing Sheets

CHAOTIC MAP ON NON-BOUNDED REGION
(WHERE $\delta_1=1$, $\delta_2=1$, AND $\alpha=1$)

CHAOTIC MAP ON NON-BOUNDED REGION
(WHERE $\delta_1=1$, $\delta_2=0.5$, AND $\alpha=1$)

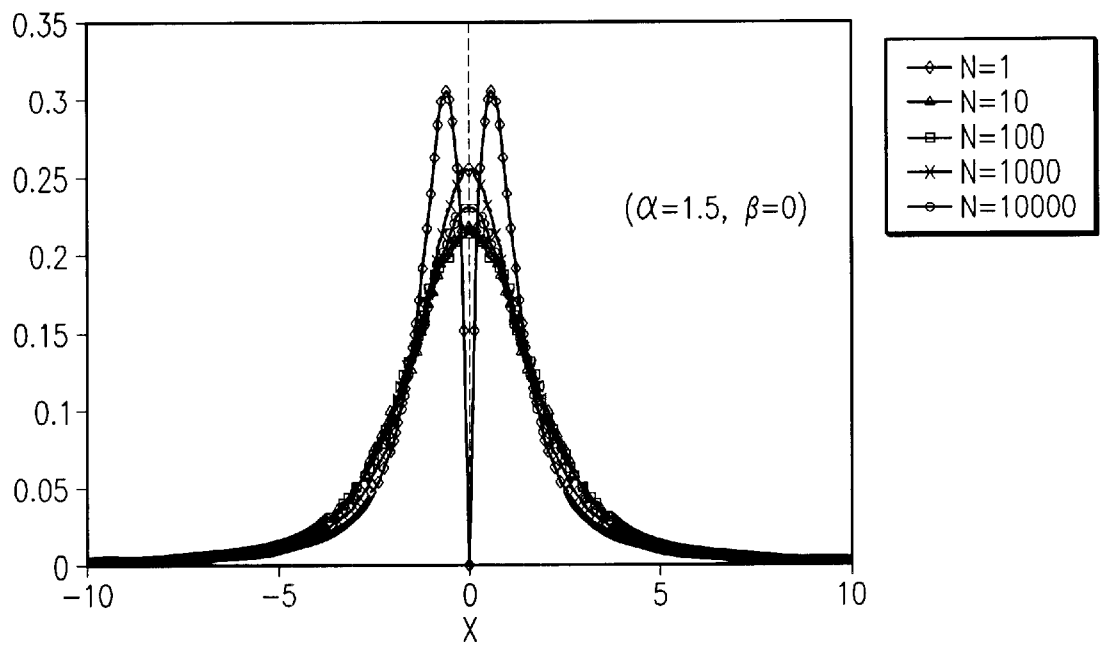
FIG. 9
FIG. 10
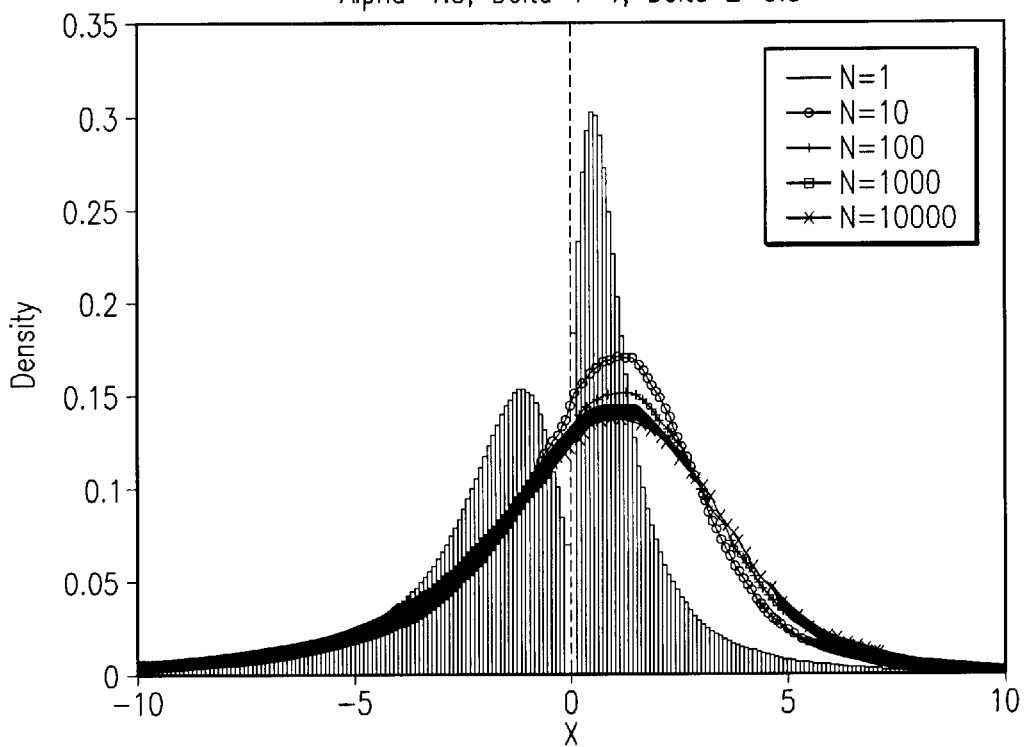

DEVICE AND METHOD FOR OUTPUTTING STOCHASTIC PROCESSES, AND DATA RECORDING MEDIUM

BACKGROUND OF THE INVENTION

1. Field of the Invention

The present invention relates to a device and a method for outputting stochastic processes, and a data recording medium. More particularly, the present invention relates to a device and a method for outputting stochastic processes, and a data recording medium which realize high speed simulation by utilizing a chaotic map based on an addition formula of a tangent function, especially for simulating Lévy's stable processes which represent fluctuation of stock prices or exchanges, or transmission times in the World Wide Web (WWW) traffic.

2. Description of the Related Art

Not only physical phenomena, chemical phenomena, biological phenomena, and the like, various activities in the human society such as merchandizing, money transfer, and value shifts have been simulated with utilizing models of stochastic processes for analyzing them to find out the best solution.

In the conventional simulations, it has been assumed that shift stationary increment during a predetermined period in the stochastic process obey an explicit density function for distribution such as Gaussian distribution. In other words, random values in the stochastic process have been obtained by utilizing the von Neumann inverse function method to obtain random variables in accordance with the density function after generating uniform random variables.

It has been known that transmission times in the WWW traffic, stock price fluctuation, price fluctuation in the foreign exchange market, or the like during a predetermined period (for example, several seconds or several minutes) shifts in accordance with the Lévy distribution (stable distribution) (R. N. Mantegna & H. E.

Stanley, Nature, vol. 376, pp. 46–49, 1995). The Lévy distribution is a distribution having parameters of indexes $\alpha$ and $\beta$ (equation 1). By the Lévy distribution, it is impossible to obtain an analytic density function unless the indexes $\alpha$ and $\beta$ show specific values. On the contrary, a Normal (Gaussian) distribution is able to show an analytic density function.

$$P(x; \alpha, \beta) = 1/2\pi \int_{-\infty}^{\infty} \exp(izx)\psi(z)dz \qquad \text{EQUATION 1}$$

where $\psi(z) = \exp\{-i\gamma z - \eta|z|^\alpha[1 + i\beta \mathrm{sgn}(z)\omega(z, \alpha)]\}$ $0 < \alpha \leq 2$ $-1 \leq \beta \leq 1$ $\gamma \geq 0$ $\omega(z, \alpha) = \tan(\pi\alpha/2)$ for $\alpha \neq 1$ $\omega(z, \alpha) = (2/\pi) \log |z|$ for $\alpha = 1$ In case of obtaining the Lévy's stable processes with utilizing the von Neumann inverse function method, Fourier integration must be carried out once as shown by equation 1 to obtain a density function, further, time-integration of random variables obtained by the density function is required in order to obtain Lévy's stable processes. A result after these computationally heavy steps is, however, an approximation.

The Cauthy distribution is a distribution by which its density function is obtained explicitly. The Cauthy distribution corresponds to the Lévy distribution at $\alpha=1$ and $\beta=0$. It has been observed that the Lévy distribution but not the Cauthy distribution appears in the empirical data of distribution of transmission times in WWW traffic traffic, stock price fluctuation, price fluctuation in the foreign exchange market, or the like.

Accordingly, integrating process must be carried out many times in the conventional technique, because it requires time-integration of the stationary increments obtained by the von Neumann inverse function method after generating uniform random variables and Fourier integration. As a result, it requires very long process time for calculation. Moreover, the result of the simulation is not reliable due to the truncation of the limits of integration.

Demands for efficient simulations such as technical simulation for developing improved communication protocol, industrial simulation for evaluating financial risks corresponding to fluctuation of stock prices or exchanges have been developing. In other words, great demand for simulating the Lévy's stable processes has been raised in the industry field.

SUMMARY OF THE INVENTION

The present invention have made in consideration of the above. It is an object of the present invention to provide a device and a method for outputting stochastic processes, and a data recording medium. More particularly, it is an object of the present invention to provide a device and a method for outputting stochastic processes, and a data recording medium which realize high speed simulation by utilizing a chaotic map based on an addition formula of a tangent function, especially for simulating Lévy's stable processes which represents fluctuation of stock prices or exchanges, or transmission times in the WWW traffic.

The present invention for accomplishing the above objects will now be disclosed in accordance with its principle.

FIG. 1 is a block diagram schematically showing a device for outputting stochastic process according to the present invention. As shown in FIG. 1, an output device 101 for outputting stochastic process according to the present invention comprises a plurality of random variable output units 102, a normalizing unit 103, and a result output unit 104.

Each of the random variable output units 102 outputs random variable sequence 105 which obeys an analytical density function of limit distribution. The normalizing unit 103 normalizes the sum of the random variables in the same row over the plurality of sequences 105 output by the plurality of random variable output units 102. The result output unit 104 time-integrates normalized values 106 sequentially supplied by the normalizing unit 103, and sequentially outputs the time-integrated value as result values in the stochastic process.

The result values 107 sequentially output by the result output unit 104 represent the stochastic process such as Lévy's stable processes.

Calculations carried out by the random variable output units 102 are not related to each other. Therefore, the random variable output units 102 can perform concurrent calculation or parallel calculation independently. An SIMD (Single Instruction Multi Data) parallel computer is available for simulating stochastic process in a case where the plurality of the random variable output units 102 do the same calculations but handling different data. The SIMD parallel computer realizes high speed simulation.

The density function of limit distribution in the sequence output by each random variable output unit 102 may be a function $\pi(\cdot)$ having the characteristics shown in equation 2.

$$\rho(x) \approx c_-|x|^{-(1+\alpha)} \text{ for } x \to -\infty$$

$$\rho(x) \approx c_+|x|^{-(1+\alpha)} \text{ for } x \to +\infty \quad \text{EQUATION 2}$$

where $0 < \alpha \leq 2$

In a case where the number of the random variable output units 102 is N and the i-th ($1 \leq i \leq N$) random variable output unit 102 outputs a sequence (x(i, 0), x(i, 1), x(i, 2), ...) of random variables, the normalizing unit 103 outputs a sequence "(v(0), v(1), v(2), ...)" of normalized values obtained by equation 3, and the result output unit 104 outputs a sequence "(L(0), L(1), L(2), ...)" of result values obtained by equation 4.

$$v(t) = \frac{\sum_{i=1}^{N} x(i,t) - A}{B} \quad \text{EQUATION 3}$$

$$A = 0, \quad B = N^{1/\alpha} \quad \text{for } 0 < \alpha < 1$$
$$A = 0, \quad B = N \quad \text{for } \alpha = 1, \bar{x} = 0$$
$$A = N^2 \sin\frac{\bar{x}}{N}, \quad B = N \quad \text{for } \alpha = 1, \bar{x} \neq 0$$
$$A = N\bar{x}, \quad B = N^{1/\alpha} \quad \text{for } 1 < \alpha < 2$$

where $\bar{x}$ is the expectation value of the random variable output x by the random variable output units $$L(t) = \sum_{j=0}^{t} v(j) \quad \text{EQUATION 4}$$

It has been proved that the normalized value sequence "v(0), v(1), v(2), ..." shows random variables in accordance with the Lévy distribution (stable distribution) when N is fully large. (B. V. Gnedenko and A. N. Kolmogorov, Limit Distributions for Sums of Independent Random Variables, Addison Wesley, Reading, Mass., 1954)

The sequence of the random variables "x(i, 0), x(i, 1), x(i, 2), ..." output by the random variable output units 102 may be obtained by a recurrence formula $x(i, t+1) = f(x(i, t))$ which utilizing a function $f(\cdot)$ obtained by equation 5.

$$f(x) = \begin{cases} \frac{1}{\delta_1} g(\delta_1 x) \text{ for } x \in X_{++} \\ \frac{1}{\delta_2} g(\delta_1 x) \text{ for } x \in X_{+-} \\ \frac{1}{\delta_1} g(\delta_2 x) \text{ for } x \in X_{-+} \\ \frac{1}{\delta_2} g(\delta_2 x) \text{ for } x \in X_{--} \end{cases} \quad \text{EQUATION 5}$$

where $\delta_1 > 0$, $\delta_2 > 0$ g(x) is a function defined by any one of the followings:
a step function sgn(x) satisfying the followings;
sgn(x)=1 for x>0
sgn(x)=-1 for x<0
any one of the following $\phi_1$ to $\phi_8$; and
$\phi_1(\theta) = -\text{sgn}(\tan \theta)/|\tan \theta|^{1/\alpha}$
$\phi_2(\theta) = -\text{sgn}(\tan \theta) \times |\tan \theta|^{1/\alpha}$
$\phi_3(\theta) = -\text{sgn}(\cos \theta)/|\tan \theta|^{1/\alpha}$
$\phi_4(\theta) = -\text{sgn}(\cos \theta) \times |\tan \theta|^{1/\alpha}$
$\phi_5(\theta) = \text{sgn}(\cos \theta)/|\tan \theta|^{1/\alpha}$
$\phi_6(\theta) = \text{sgn}(\cos \theta) \times |\tan \theta|^{1/\alpha}$
$\phi_7(\theta) = \text{sgn}(\sin \theta)/|\tan \theta|^{1/\alpha}$
$\phi_8(\theta) = \text{sgn}(\sin \theta) \times |\tan \theta|^{1/\alpha}$
$\phi_i(l\theta) = g(\phi_i(l\theta))$ for $1 \leq i \leq 8$ where l is a natural number equal to or greater than 2
$X_{++}$ represents a legion of x where $g(x) \geq 0$ and $x \geq 0$
$X_{+-}$ represents a region of x where $g(x) < 0$ and $x \geq 0$
$X_{-+}$ represents a region of x where $g(x) \geq 0$ and $x < 0$
$X_{--}$ represents a region of x where $g(x) < 0$ and $x < 0$ FIG. 2 is a block diagram schematically showing the structure of the random variable output unit 102. Like or same reference numerals used in FIG. 1 are also used in FIG. 2 to denote corresponding or identical components.

The random variable output unit 102 comprises a storage unit 202, an output unit 203, a calculator 203, and an update unit 205.

The storage unit 202 stores a random variable 105 to be output next. The output unit 203 outputs the random variable 105 in the storage unit 202. The calculator 204 calculates a predetermined function for which the random variable 105 in the storage unit 202 is substituted to obtain a result 207. The update unit 205 supplies the result 207 to the storage unit 202 for storing.

FIG. 3 is a block diagram schematically showing the structure of the result output unit 104 in the device 100 for outputting stochastic process according to the present invention. Like or same reference numerals used in FIG. 1 are also used in FIG. 3 to denote corresponding or identical components.

The result output unit 104 comprises a storage unit 302 for storing integrated values, an output unit 303 for outputting integrated values, a sum calculator 304, and an update unit 305 for updating integrated values.

The integrated value storage unit 302 stores integrated values, and the output unit 303 outputs the values in the integrated value storage unit 302 as the results 107 of the stochastic process. The sum calculator 304 calculates a sum 306 of the value 106 output by the normalizing unit 103 and the value 107 in the storage unit 302. The update unit 305 supplies the sum 306 to the storage unit 302 for storing.

Here, the results 107 sequentially output by the normalizing unit 103 represent the Lévy's stable processes. That is, increment of the results 107 represent the value 106 output by the normalizing unit 103, thus, the value 106 is output in accordance with the Lévy stable distribution.

A method of outputting stochastic process according to the present invention may include the steps of outputting random variables, outputting normalized values, and outputting results.

In the random variable output step, a plurality of sequences of random variables represented by a function for obtaining an analytical density function of limit distribution are output. In the normalized value outputting step, the sum of the random variables in the same row over the sequences output by the random variable outputting step is normalized. In the result outputting step, values sequentially output by the normalized value outputting step are time-integrated, and the integrated values are sequentially output as a result in the stochastic process.

Each of density functions of limit distribution for the random variable sequences output by the random variable outputting step of the method according to the present invention may be a function $\rho(\cdot)$ having the characteristics shown by equation 6.

$$\rho(x) \approx c_-|x|^{-(1+\alpha)} \text{ for } x \to -\infty$$

$$\rho(x) \approx c_+|x|^{-(1+\alpha)} \text{ for } x \to +\infty \quad \text{EQUATION 6}$$

where $0 < \alpha \leq 2$

In a case where the number of the random variable sequences output by the random variable outputting step is N and the i-th ($1 \leq i \leq N$) sequence is (x(i, 0), x(i, 1), x(i, 2), . . . ), the normalized value outputting step outputs a sequence "(v(0), v(1), v(2), . . . )" of normalized values obtained by equation 7, and the result outputting step outputs a sequence "(L(0), L(1), L(2), . . . )" of result values obtained by equation 8.

$$v(t) = \frac{\sum_{i=1}^{N} x(i, t) - A}{B} \quad \text{EQUATION 7}$$

$A = 0, \quad B = N^{1/\alpha} \quad \text{for } 0 < \alpha < 1$ $A = 0, \quad B = N \quad \text{for } \alpha = 1, \bar{x} = 0$ $A = N^2 \sin\frac{\bar{x}}{N}, \quad B = N \quad \text{for } \alpha = 1, \bar{x} \neq 0$ $A = N\bar{x}, \quad B = N^{1/\alpha} \quad \text{for } 1 < \alpha < 2$ where $\bar{x}$ is the expectation value of the random variable output x by the random variable output units $$L(t) = \sum_{j=0}^{t} v(j) \quad \text{EQUATION 8}$$

The sequence of the random variables x(i, 0), x(i, 1), x(i, 2), . . . output by the random variable outputting step may be obtained by a recurrence formula x(i, t+1) = f(x(i, t)) which utilizing a function f(·) obtained by equation 9.

$$f(x) = \begin{cases} \frac{1}{\delta_1} g(\delta_1 x) & \text{for } x \in X_{++} \\ \frac{1}{\delta_2} g(\delta_1 x) & \text{for } x \in X_{+-} \\ \frac{1}{\delta_1} g(\delta_2 x) & \text{for } x \in X_{-+} \\ \frac{1}{\delta_2} g(\delta_2 x) & \text{for } x \in X_{--} \end{cases} \quad \text{EQUATION 9}$$

where $\delta_1 > 0$, $\delta_2 > 0$
g(x) is a function defined by any one of the followings:
a step function sgn(x) satisfying the followings;
sgn(x)=1 for x>0
sgn(x)=−1 for x<0
any one of the following $\phi_1$ to $\phi_8$; and
$\phi_1(\theta) = -\text{sgn}(\tan \theta)/|\tan \theta|^{1/\alpha}$
$\phi_2(\theta) = -\text{sgn}(\tan \theta) \times |\tan \theta|^{1/\alpha}$
$\phi_3(\theta) = -\text{sgn}(\cos \theta)/|\tan \theta|^{1/\alpha}$
$\phi_4(\theta) = -\text{sgn}(\cos \theta) \times |\tan \theta|^{1/\alpha}$
$\phi_5(\theta) = \text{sgn}(\cos \theta)/|\tan \theta|^{1/\alpha}$
$\phi_6(\theta) = \text{sgn}(\cos \theta) \times |\tan \theta|^{1/\alpha}$
$\phi_7(\theta) = \text{sgn}(\sin \theta)/|\tan \theta|^{1/\alpha}$
$\phi_8(\theta) = \text{sgn}(\sin \theta) \times |\tan \theta|^{1/\alpha}$
$\phi_i(l\theta) = g(\phi_i(l\theta))$ for $1 \leq i \leq 8$
where l is a natural number equal to or greater than 2
$X_{++}$ represents a legion of x where $g(x) \geq 0$ and $x \geq 0$
$X_{+-}$ represents a region of x where $g(x) < 0$ and $x \geq 0$
$X_{-+}$ represents a region of x where $g(x) \geq 0$ and $x < 0$
$X_{--}$ represents a region of x where $g(x) < 0$ and $x < 0$ The random variable outputting step of the method according to the present invention may include the steps of outputting, calculating, and updating.

In the outputting step, values stored in a plurality of storage units each storing a next random variable to be output are output. In the calculating step, a predetermined function for which the random variable in the storage unit is substituted is calculated. In the updating step, the results of the calculating step are supplied to the storage units for storing.

The result outputting step of the method according to the present invention may comprise the steps of outputting integrated values, calculating sum, and updating the integrated values.

In the integrated value outputting step, integrated values stored in storage are output as results in the stochastic process. In the sum calculation step, the value output by the normalizing step and the integrated value stored in the storage are added to each other. In the integrated value updating step, the sum calculated by the sum calculation step is supplied to the storage for storing.

Programs which realize the device and method for outputting stochastic process according to the present invention may be stored in a data recording medium such as a compact disc, a floppy disk, a hard disk, a magneto-optical disk, a digital versatile disc, a magnetic tape, and a semiconductor memory device.

The above described device and method for outputting stochastic process will be realized by executing the programs stored in a data recording medium according to the present invention by a data processor such as a general purpose computer and a parallel computer having a storage device, a calculator, an output device, and the like.

It is able to distribute and merchandize the data recording medium storing the programs according to the present invention as an independent product separated from the data processor.

BRIEF DESCRIPTION OF THE DRAWINGS

These objects and other objects and advantages of the present invention will become more apparent upon reading of the following detailed description and the accompanying drawings in which:

FIG. 9 is a graph showing a result of simulating the Lévy stable distribution according to the first embodiment;

FIG. 10 is a graph showing a result of simulating the Lévy stable distribution according to the first embodiment;

DETAILED DESCRIPTION OF THE PREFERRED EMBODIMENTS

One embodiment of the present invention will now be described. One skilled in the art may be able to propose modified embodiments each of which include all or some elements described in the following embodiments of the present invention. Such the modified embodiments will be included in the scope of the present invention, because the following embodiments of the present invention do not limit the scope of the present invention but just explain the present invention.

First Embodiment

Figure 4:
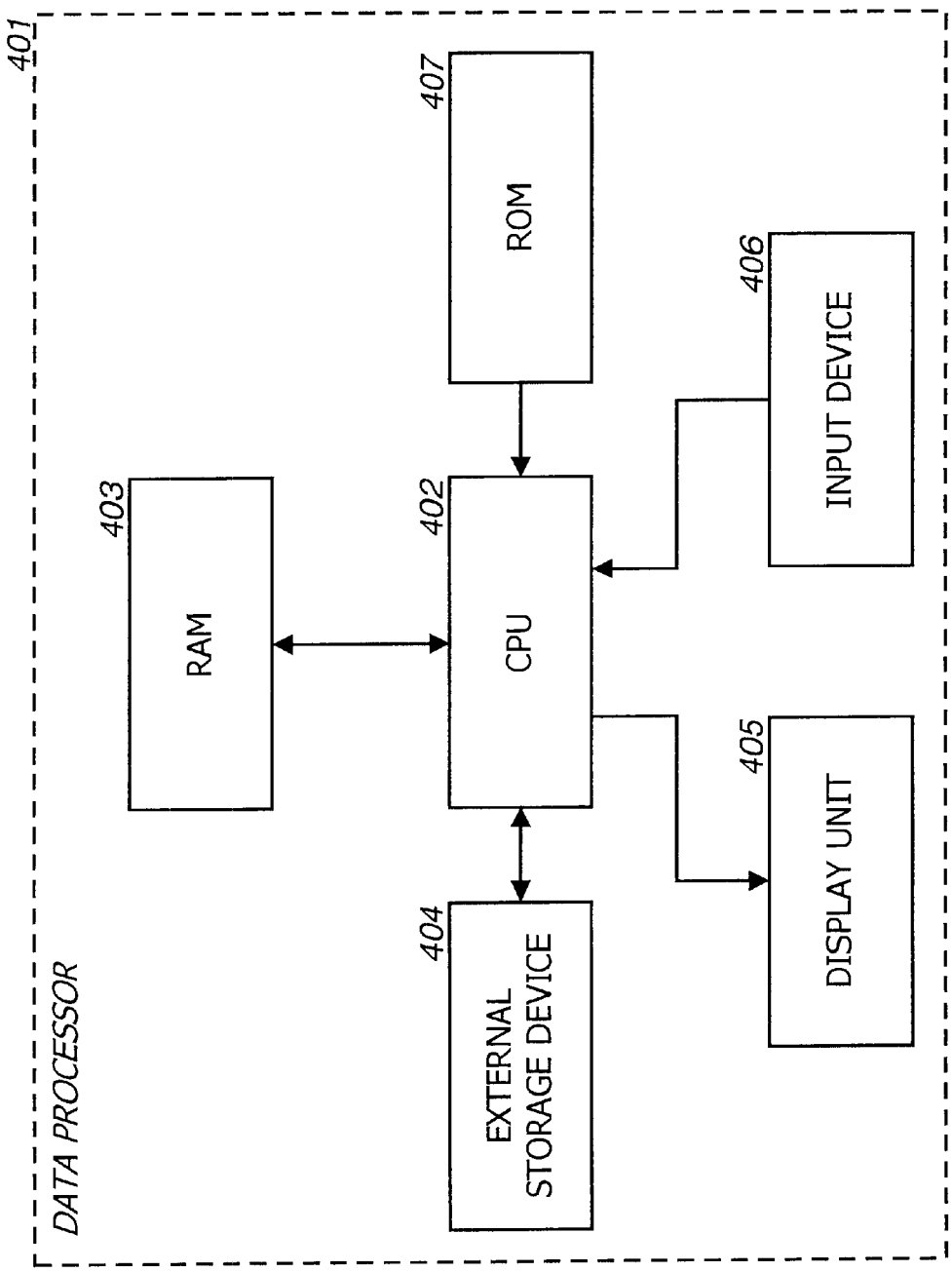
FIG. 4 is a block diagram schematically showing a data processor acting as the device for outputting stochastic process according to the present invention.

FIG. 4 is a block diagram schematically showing the structure of a data processor which acts as the device for outputting stochastic process according to the present invention.

A data processor 401 comprises a CPU (Central Processing Unit) 402, a RAM (Random Access Memory) 403, an external storage device 404 such as a hard disk drive and a floppy disk drive for storing programs to be executed by the CPU 402, results and the like, a display unit 405 such as a CRT (Cathode Ray Tube) display and a liquid crystal display for displaying the results given by the CPU 402, an input device 406 such as a keyboard and a mouse for inputting instructions given by a user, and a ROM (Read Only Memory) 407 in which an IPL (Initial Program Loader) for loading the operating system when system booting, and the like are stored.

The CPU 402 controls the RAM 403, the external storage device 404, the display unit 405, the input devices 406, and the ROM 407 by supplying/receiving data to/from them.

The CPU 402 comprises an ALU (Arithmetic and Logic Unit: not shown) which executes various calculations. In a case where the CPU 402 comprises a plurality of ALU, it is able to perform SIMD calculation or super scalar calculation which is a parallel calculation of independent calculations. Such the calculations realize high speed simulation of stochastic process.

The CPU 402 and the RAM 403 collaborate to process data, that is, the CPU 402 acts as the random variable output unit, the normalizing unit, the result output unit, the output unit, the calculator, the update unit, the integrated value output unit, the sum calculator, and the integrated value update unit, while the RAM 403 acts as the storage unit and the integrated value storage unit. The external storage device 404 and its medium such as a floppy disk and a compact disc act as a data recording medium according to the present invention.

Figure 5:
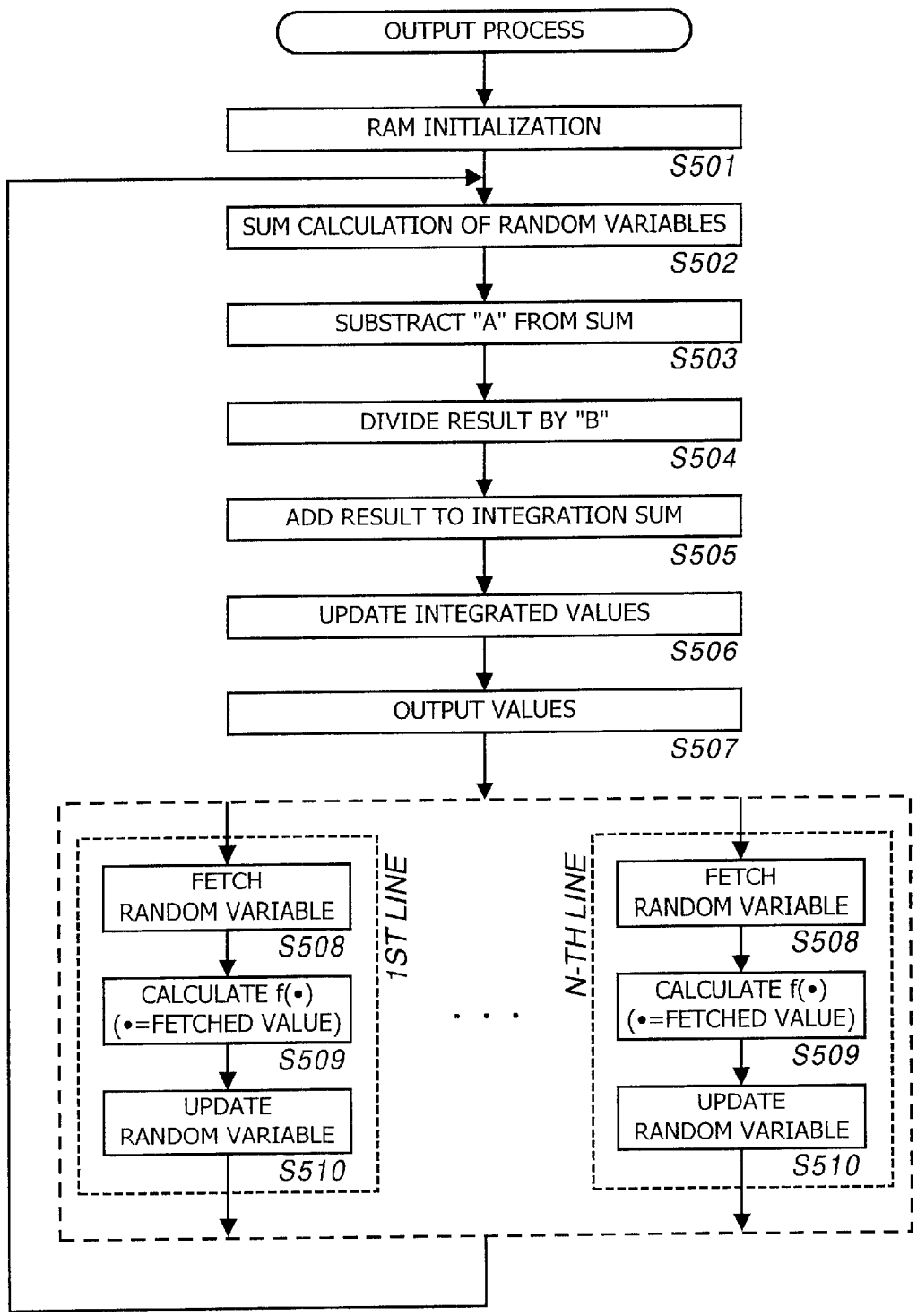
FIG. 5 is a flowchart showing process of outputting stochastic process executed by the data processor shown in FIG. 4.

FIG. 5 is a flowchart showing steps of outputting stochastic process executed by the data processor 401 shown in FIG. 4. Steps for realizing the present invention will now be described with reference to FIG. 5.

The CPU 402 accesses the RAM 403 for reserving areas for storing first to N-th random variables, and for storing integrated values. The reserved areas are initialized (step S501).

Figure 1:
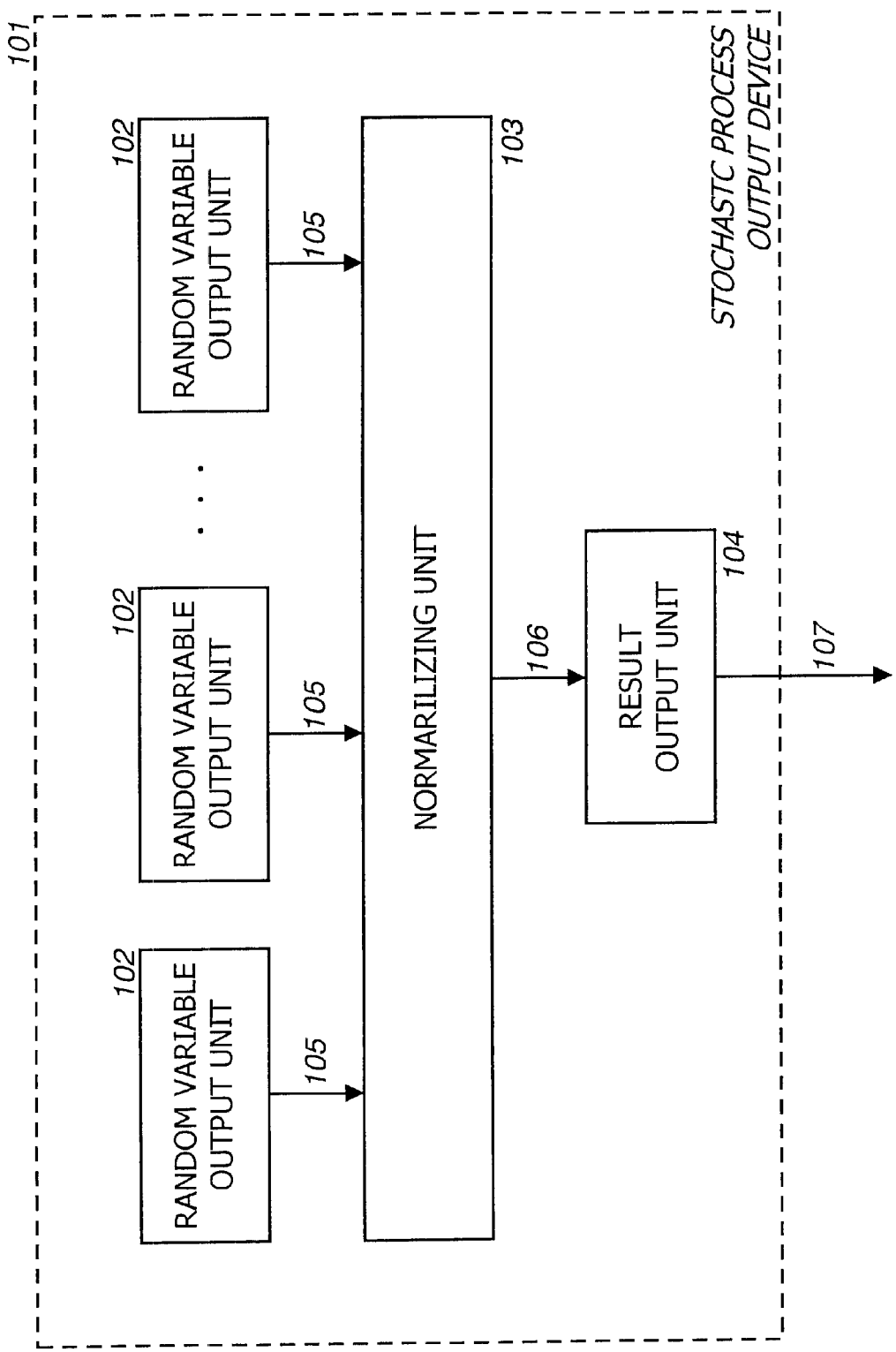
FIG. 1 is a block diagram schematically showing the structure of a device for outputting stochastic process according to the present invention.
Figure 2:
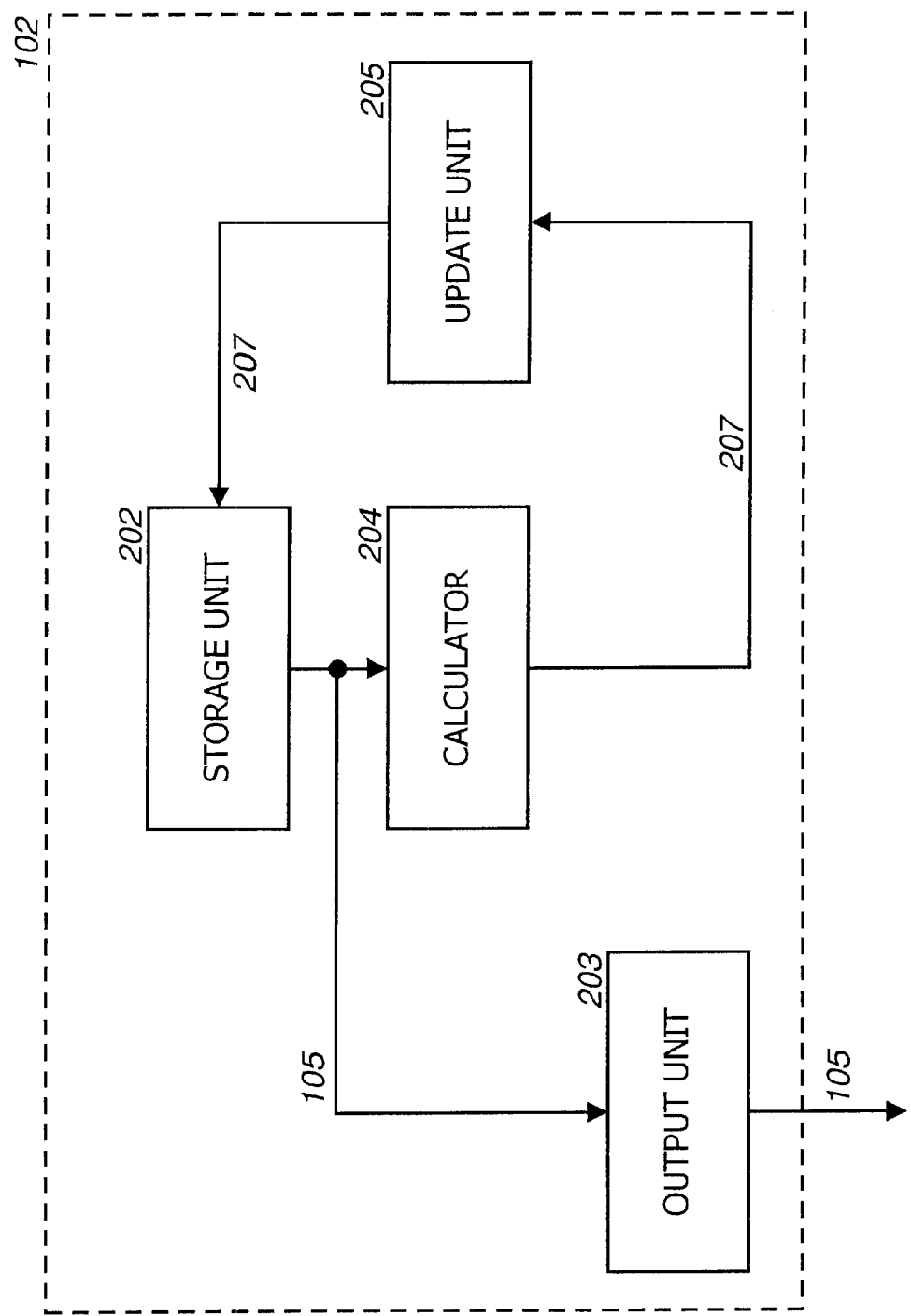
FIG. 2 is a block diagram schematically showing the structure of a random variable output unit in the device for outputting stochastic process according to the present invention.
Figure 3:
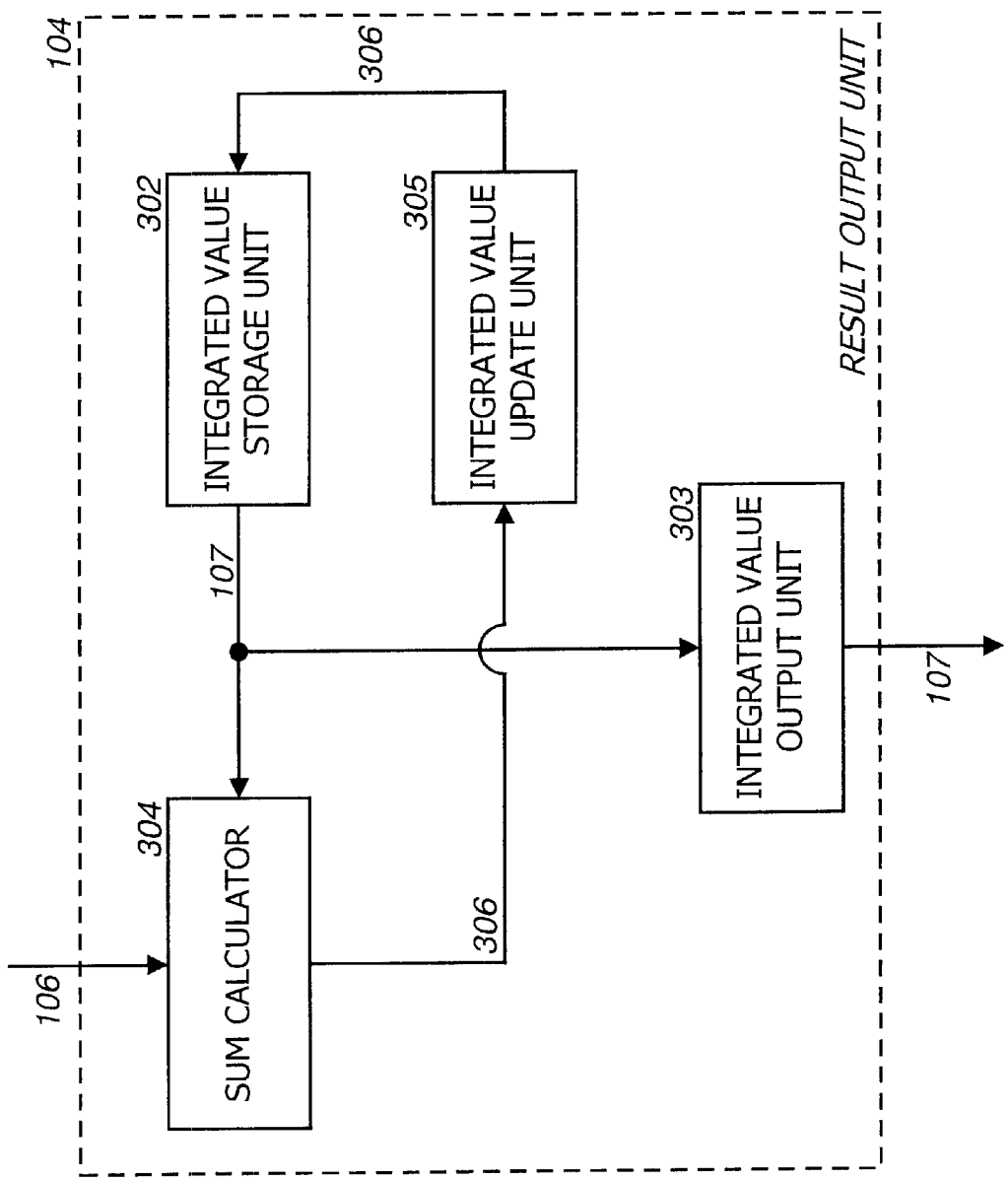
FIG. 3 is a block diagram schematically showing a result output unit in the device for outputting stochastic process according to the present invention.
Figure 6:
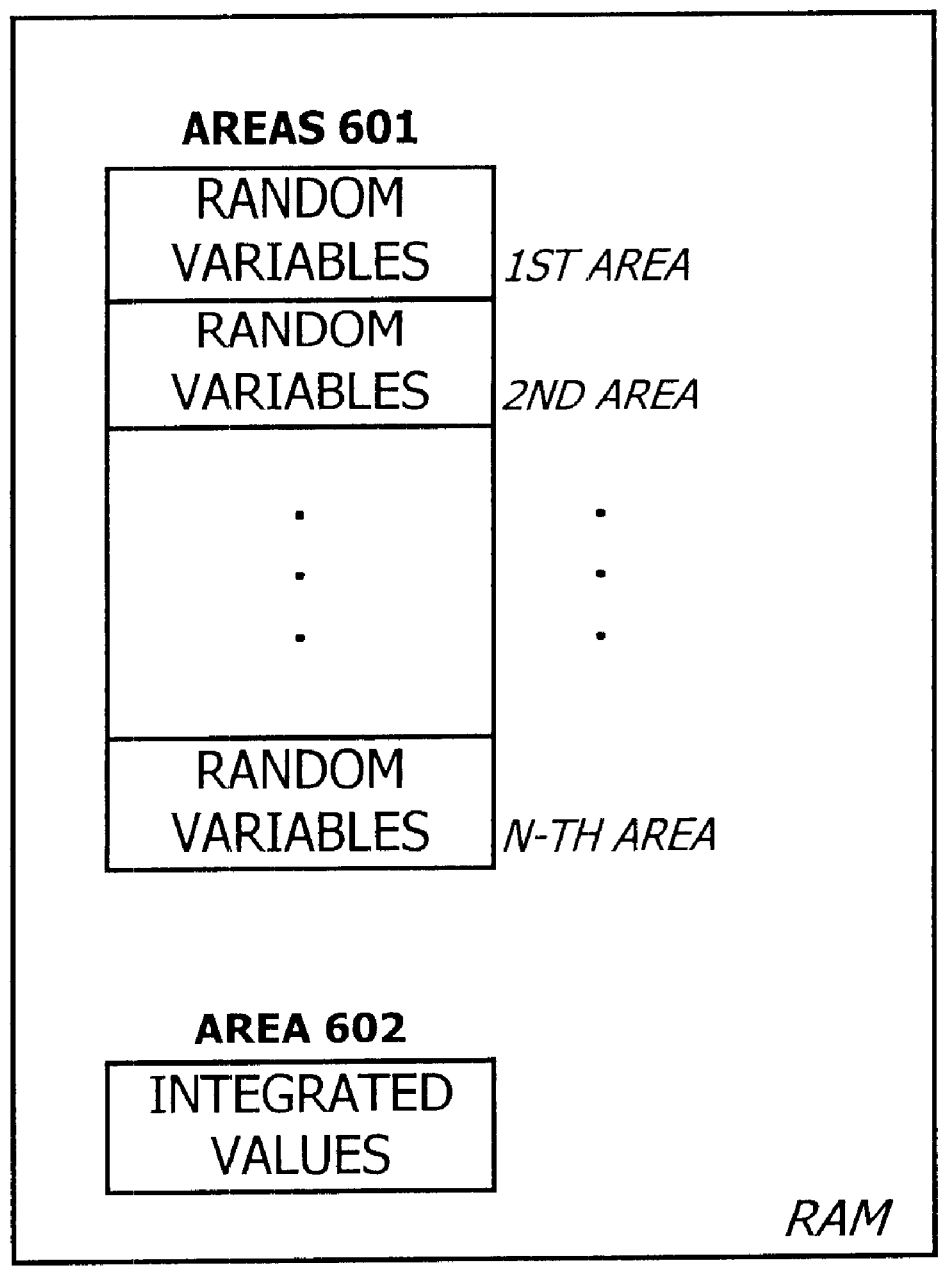
FIG. 6 is a diagram for explaining areas in a RAM reserved for the process of outputting stochastic process executed by the data processor shown in FIG. 4.

FIG. 6 shows reserved areas in the RAM 403. Like or same reference numerals used in FIG. 4 are also used in FIG. 6 to denote corresponding or identical components. The areas 601 for storing first to N-th random variables act as the storage unit 202 shown in FIG. 2, and the area 602 for storing integrated values acts as the storage unit 302 shown in FIG. 3.

Values to be seeds of random variables are scattered so that each of the areas 601 stores one of the values. The values may be obtained by an ordinary known method for obtaining present time, the numbers of $\alpha$ particles, $\beta$ particles and $\gamma$ particles after decay, or the like.

The area 602 stores an initial value for simulation. In case of stock price simulation, for example, the area 602 stores stock price when the stock is shared at a counter or stock price at a time where the simulation starts.

The CPU 402 fetches the values stored in the areas 601, and calculates the sum of them (step S502). The CPU 402 subtracts a value represented by "A" in equation 3 from the sum (step S503), and further divides the result by a value represented by "B" in equation 3 (step S504).

The CPU 402 calculates the sum of the result of step S504 and the value stored in the area 602 (step S505), and stores the resultant sum in the area 602 (step S506).

The CPU 402 outputs the result of step S506 to the RAM 403, the external storage device 404, the display unit 405, and the like (step S507).

The CPU 402 further fetches the values in the areas 601 (step S508), calculates the function $f(\cdot)$ in equation 5 while utilizing the fetched values (step S509), and supplies resultant values to the corresponding areas 601 for updating (step S510). The above steps S508 to S510 may be independently carried out for each of the areas 601.

The above processing may be executed by repeated serial processing, parallel processing with co-routines, or SIMD parallel processing with plural ALU operated in parallel. Since the values in the areas 601 are processed independently, various known techniques of parallel or concurrent calculation are applicable to the present invention. Embodiments utilizing such the techniques are also included in the scope of the present invention.

After updating the values in the areas 601, the process flow returns to step S502.

In this embodiment, steps S502 to S504 correspond to the normalized value outputting step, steps S505 to S507 correspond to the result outputting step, and steps S508 to S510 correspond to the random variable outputting step. The result of step S504 accords with the Lévy stable distribution, and the result of step S507 represents the Lévy's stable processes.

This embodiment has described repeat execution of the process for obtaining the results, however, it is easy to convert the process flow into other process flow which is executed repeatedly. Such the modified embodiment is also included in the scope of the present invention.

Examples of Simulation Results

Figure 7:
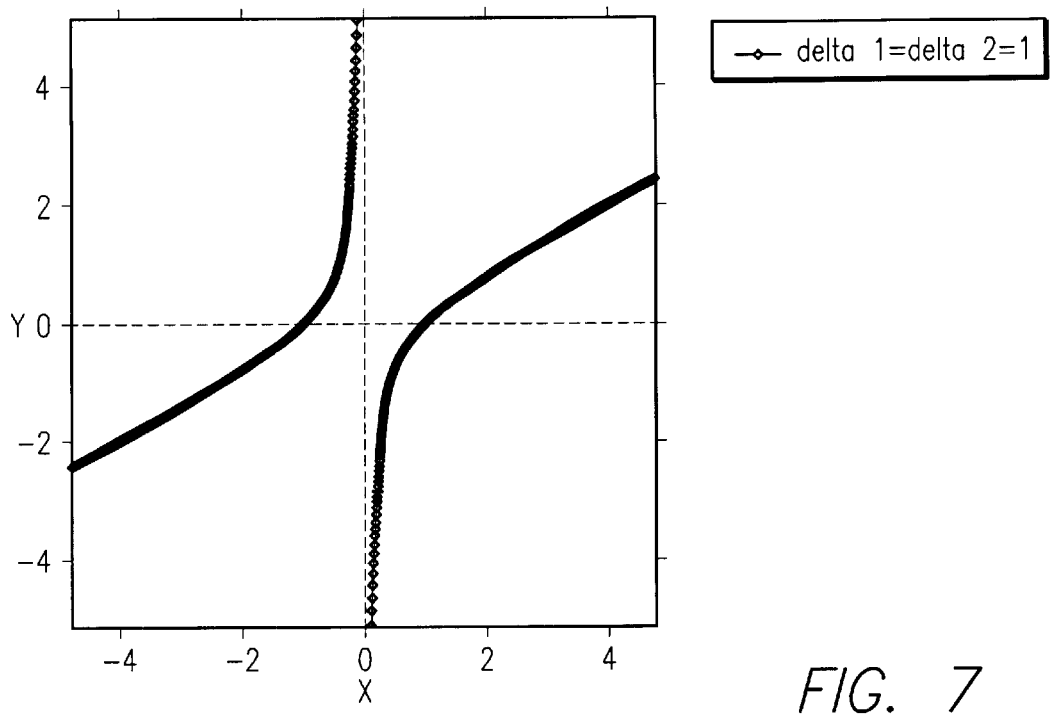
FIG. 7 is a graph representing a chaotic map employed in the present invention (symmetric case)
Figure 8:
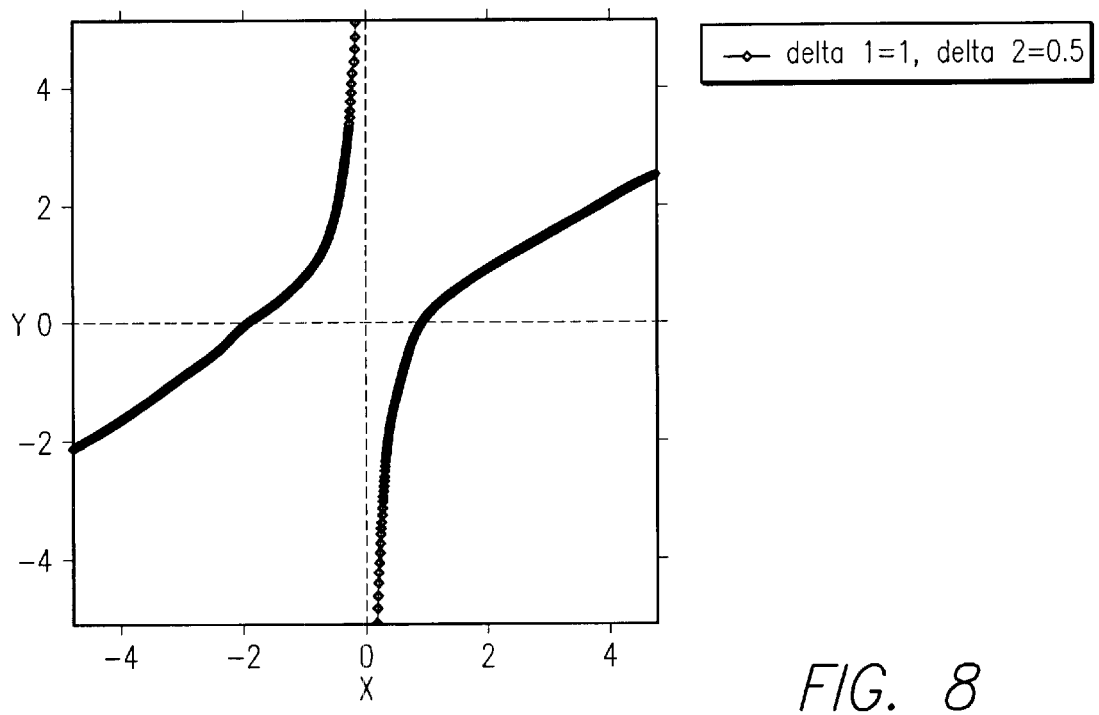
FIG. 8 is a graph representing a chaotic map employed in the present invention (asymmetric case)

FIGS. 7 and 8 are graphs representing the function $f(\cdot)$ in equation 5. The function $f(\cdot)$ is called a chaotic map. Addition formula of a tangent function is utilized for obtaining various chaotic maps for outputting the Lévy's stable processes. The function $f(\cdot)$ is obtained by an l-times multiplication formula (l is an integer$\geq 2$) of a tangent function. The inventor has disclosed mathematical backgrounds and proofs of the above in his thesis (Ken Umeno, Superposition of chaotic processes with convergence to Lévy's stable law, Physical Review E, vol. 58, no. 2, The American Physical Society August 1998).

FIG. 7 is a graph exemplifying the function $f(\cdot)$ which is point symmetry relative the origin. In this case, the function $f(\cdot)$ utilizes parameters shown in equation 10.

$$l=2$$
$$\phi(x)=\phi_1(x)$$
$$\delta_1=1$$
$$\delta_2=1$$
$$\alpha=1 \qquad \text{EQUATION 10}$$

FIG. 8 is a graph exemplifying the function f(·) which is point asymmetry relative the origin. In this case, the function f(·) utilizes parameters shown in equation 11.

$$l=2$$
$$\phi(x)=\phi_1(x)$$
$$\delta_1=1$$
$$\delta_2=0.5$$
$$\alpha=1 \qquad \text{EQUATION 11}$$

Equation 12 shows relationships among the parameters.

$$c_+ = \frac{\alpha}{\pi\delta_1^\alpha}$$
$$c_- = \frac{\alpha}{\pi\delta_2^\alpha} \qquad \text{EQUATION 12}$$
$$\beta = \frac{c_+ - c_-}{c_+ + c_-}$$

Parameter α represents the scaling index of the tail of the Lévy's stable distribution, and parameter α represents the skewness of the Lévy's stable distribution. FIGS. 9 and 10 show the Lévy's stable distribution obtained through this embodiment. More precisely, FIGS. 9 and 10 are histograms showing the results of step S504. FIG. 9 shows simulation results of the symmetry case (β=0), and FIG. 10 shows simulation results of the asymmetry case (β≠0).

Figure 11:
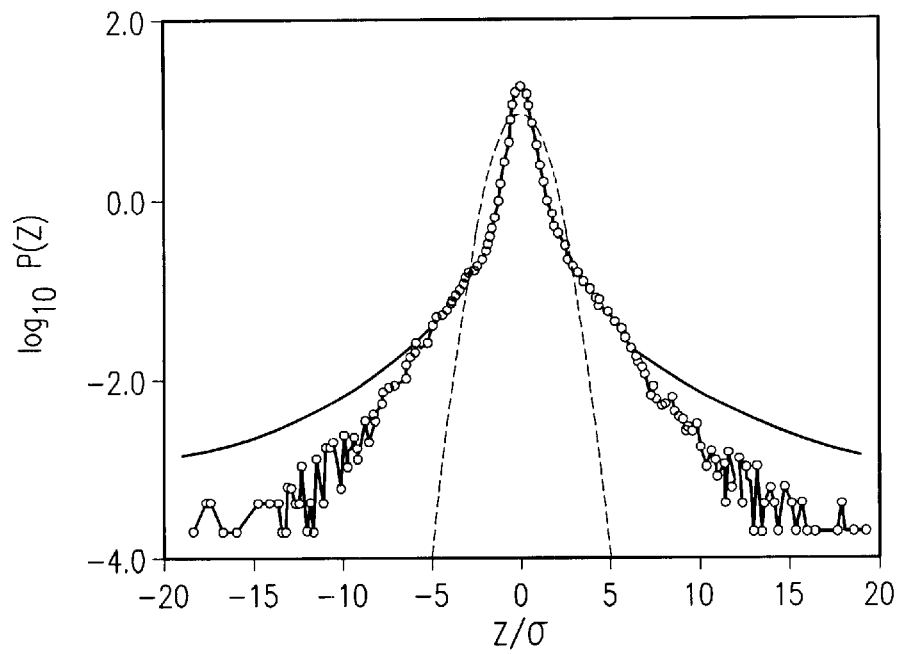
FIG. 11 is a graph for comparing actual stock price fluctuation at predetermined intervals and the Lévy stable distribution.

FIG. 11 is a graph showing symmetry Lévy's stable distribution and distribution of actual stock price fluctuation (difference) (R. N. Mantegna & H. E. Stanley, Nature, vol. 376, pp. 46–49, 1995). In the graph, a zigzagged line represents the minutely fluctuation (high frequency fluctuation) of the stock price, and a line forming a broad foot represents the Lévy's stable distribution. And a line concave down represents Gaussian distribution.

It is obvious from FIG. 11 that the high frequency fluctuation of actual stock price is close to the Lévy's stable distribution (where α=1.40 and β=0) rather than the Gaussian distribution.

Figure 12:
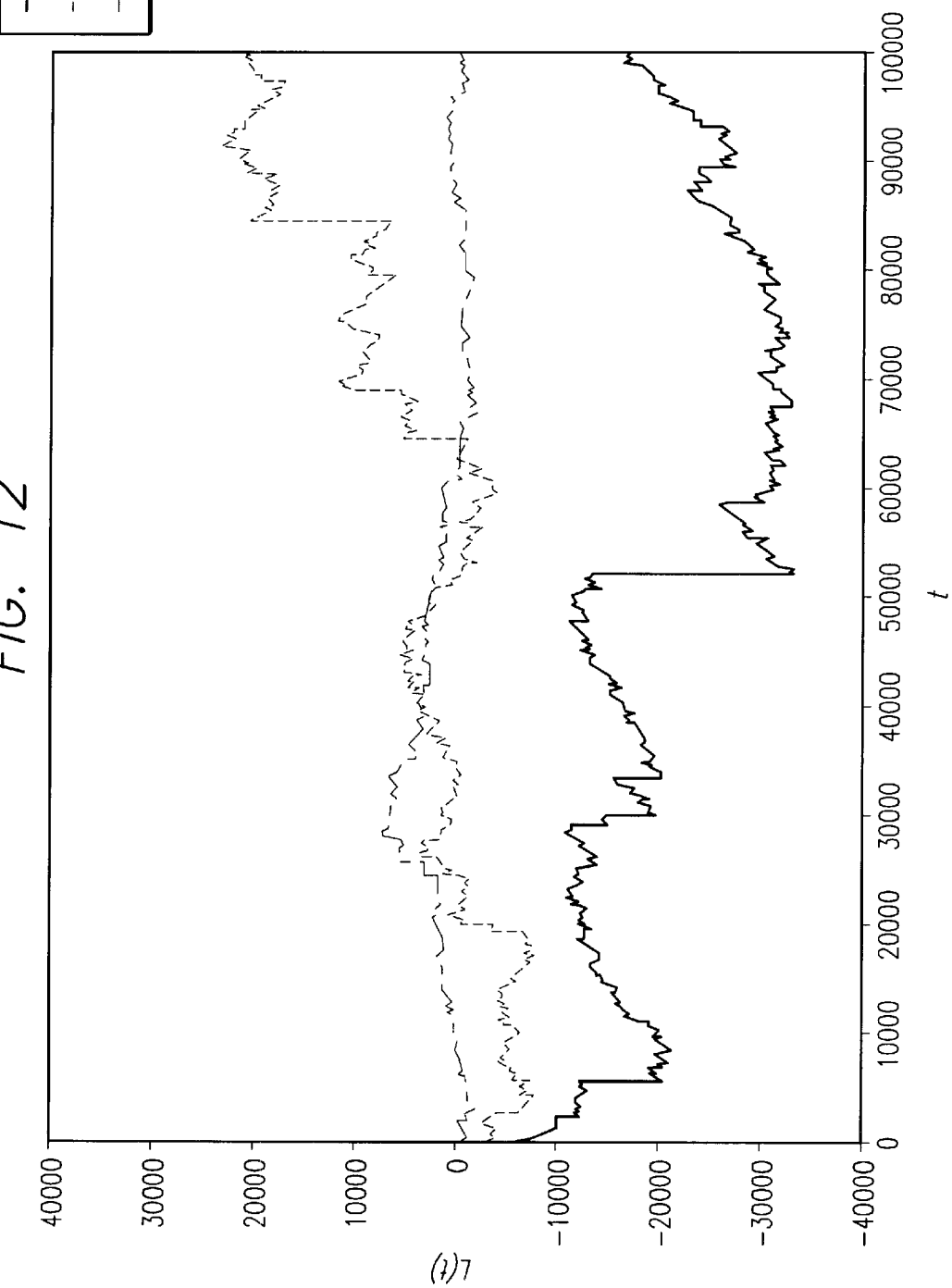
FIG. 12 is a graph showing a result of simulating stock price fluctuation obtained through the first embodiment.

FIG. 12 shows simulated stock price fluctuation, that is, FIG. 12 is a graph which is prepared by plotting the values obtained at step S507. The graph shows three phases of the fluctuation: up, down, and stable. Those correspond to β>0, β<0 , and β=0 respectively.

In FIG. 12, α represents a constant value 3/2. Intensity of the fluctuation depends on how α is smaller than 2. That is, when α is greatly smaller than 2, the graph shows intense fluctuation of the stock price.

Second Embodiment

In the first embodiment, the resultant Lévy's stable distribution spreads to both positive and negative sides. For simulating a case in which resultant values of stochastic process, for example, increase continuously, a user may desire resultant distribution which spreads only to one of positive and negative sides.

Such the one-sided distribution is available when parameter β of the Lévy's stable distribution equals to 1 or −1. More precisely, in the case where β=1 and 0<α<1, resultant values of stochastic process increase continuously, while the case of β=−1 and 0<α<1 brings continuous decrease.

To obtain the above result, parameters in equation 12 other than β are adjusted so that β equals to 1 or −1. In case of β=1 and 0<α<1, the resultant values of step S509 are utilizable. In this case, required steps are just calculating absolute values of the resultant values of step S509 and storing the absolute values in the areas 601. Similarly, the resultant values of step S509 are also utilizable in case of β=−1. In this case, required steps are just calculating absolute values of the resultant values of step S509, multiplying the absolute values by −1, and storing them in the areas 601.

Figure 13:
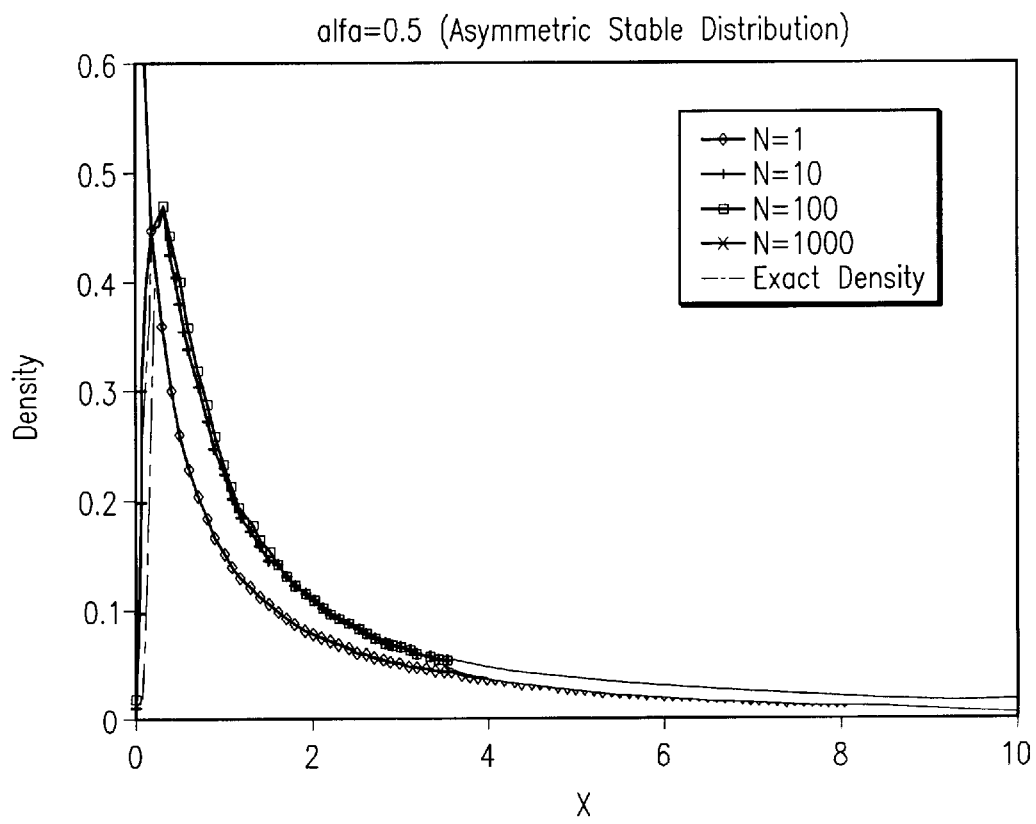
FIG. 13 is a graph showing the Lévy stable distribution obtained through a second embodiment.

FIG. 13 is a graph showing one-sided Lévy's stable distribution obtained through this embodiment. Since the shown graph spreads only to positive side, it represents Lévy's stable processes which simply increase.

Third Embodiment

In the above first and second embodiments, a data processor such as a general purpose computer acts as the device for outputting stochastic process according to the present invention. This embodiment features an electronic circuit which acts as the device for outputting stochastic process according to the present invention.

A combination of a latch circuit, an arithmetic circuit (whose clock frequency is represented as "a"), and an update circuit acts as the aforementioned random variable output unit. The latch circuit stores a value. The arithmetic circuit calculates a next value based on the stored value. The update circuit updates the value in the latch circuit at predetermined clock timings by replacing it with the value output by the arithmetic circuit.

Another arithmetic circuit (whose clock frequency is represented as "b") acts as the aforementioned normalizing unit.

A combination of an addition circuit (whose clock frequency is represented as "c") and another latch circuit acts as the result output unit. The addition circuit integrates result values. The latch circuit stores the integrated value. In this case, result values in stochastic process at predetermined intervals are obtainable by obtaining the values stored in the latch circuit at predetermined timings.

In this embodiment, the result value in the stochastic process is output at clock timings represented as "(a+b+c)". The random variable output unit may employ clock timing of "a" as offset, while the result output unit may employ clock timing of "(a+b+c)" as offset. Thus, the values in the random variable output unit and the result output unit are updated at clock timings represented as "(a+b+c)".

According to the present invention, it is provided a device and a method for outputting stochastic process. More particularly, it is provided a device and a method for carrying out efficient high speed simulation to output Lévy's stable processes which represents fluctuation of stock prices or exchanges, or transmission times in the WWW traffic.

A data recording medium storing a program according to the present invention realizes easy merchandize or distribution of the program as a software product independent from a hardware product such as a data processor. Execution of the program stored in the data recording medium according to the present invention by the data processor such as a general purpose computer realizes the device and method for outputting stochastic process according to the present invention.

Various embodiments and changes may be made there unto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-122361 filed on Apr. 28, 1999 and including specification, claims, drawings and summary. The disclosure of the above Japanese Patent Application is incorporated herein by reference in its entirety.

What is claimed is:

1. A device for outputting stochastic process comprising:
   a plurality of random variable output units each of which outputs a sequence of random variables whose limiting distribution obeys an explicit density function;
   a normalizing unit which normalizes the sum of the random variables in the same row over the plurality of the random variable sequences output by the plurality of said random variable output units, and sequentially outputs resultant values; and
   a result output unit which integrates the values sequentially output by said normalizing unit, and sequentially outputs the integrated values as result values of stochastic process;
   and each of the density functions of limiting distributions in the random variable sequences output by the plurality of said random variable output units is a function $\rho(\cdot)$ having the characteristics shown in equation 13;

$$\rho(x) \approx c_- |x|^{-(1+\alpha)} \text{ for } x \to -\infty$$
$$\rho(x) \approx c_+ |x|^{-(1+\alpha)} \text{ for } x \to +\infty \quad \text{EQUATION 13}$$

where
   $0 < \alpha \leq 2$,
   $0 \leq c_-$, and
   $0 \leq c_+$.

2. The device according to claim 1, wherein the number of the plurality of said random variable output units is N, and
   said normalizing unit outputs a sequence "v(0), v(1), v(2), . . . " of normalized values obtained by equation 14 when an i-th random variable output unit (where $1 \leq i \leq N$) outputs a sequence "x(i, 0), x(i, 1), x(i, 2), . . . " of random variables, and
   said result output unit outputs a sequence "L(0), L(1), L(2), . . . " of result values obtained by equation 15;

$$v(t) = \frac{\sum_{i=1}^{N} x(i, t) - A}{B} \quad \text{EQUATION 14}$$

where
   $A = 0$, $B = N^{1/\alpha}$ for $0 < \alpha \leq 1$,
   $A = 0$, $B = N$ for $\alpha = 1$, $\bar{x} = 0$,
   $A = N^2 \overline{\sin x/N}$, $B = N$ for $\alpha = 1$, $\bar{x} \neq 0$,
   $A = N\bar{x}$, $B = N^{1/\alpha}$ for $1 < \alpha < 2$, and
   $\bar{x}$ is the expectation value of the random variable output x by the random variable output units.

$$L(t) = \sum_{j=0}^{t} v(j) \quad \text{EQUATION 15}$$

3. The device according to claim 2, wherein each of the sequences x(i, 0), x(i, 1), x(i, 2) of random variables output by each of said random variable output units is obtained by a recurrence formula x(i, t+1)=f(x(i, t)) which utilizes a function $f(\cdot)$ obtained by equation 16;

$$f(x) = \begin{cases} \frac{1}{\delta_1} g(\delta_1 x) \text{ for } x \in X_{++} \\ \frac{1}{\delta_2} g(\delta_1 x) \text{ for } x \in X_{+-} \\ \frac{1}{\delta_1} g(\delta_2 x) \text{ for } x \in X_{-+} \\ \frac{1}{\delta_2} g(\delta_2 x) \text{ for } x \in X_{--} \end{cases} \quad \text{EQUATION 16}$$

where $\delta_1 > 0$, $\delta_2 > 0$
   g(x) is a function defined by any one of the followings:
   a step function sgn(x) satisfying the followings;
   sgn(x)=1 for x>0
   sgn(x)=-1 for x<0
   any one of the following $\phi_1$ to $\phi_8$; and
   $\phi_1(\theta) = -\text{sgn}(\tan \theta)/|\tan \theta|^{1/\alpha}$
   $\phi_2(\theta) = -\text{sgn}(\tan \theta) \times |\tan \theta|^{1/\alpha}$
   $\phi_3(\theta) = -\text{sgn}(\cos \theta)/|\tan \theta|^{1/\alpha}$
   $\phi_4(\theta) = -\text{sgn}(\cos \theta) \times |\tan \theta|^{1/\alpha}$
   $\phi_5(\theta) = \text{sgn}(\cos \theta)/|\tan \theta|^{1/\alpha}$
   $\phi_6(\theta) = \text{sgn}(\cos \theta) \times |\tan \theta|^{1/\alpha}$
   $\phi_7(\theta) = \text{sgn}(\sin \theta)/|\tan \theta|^{1/\alpha}$
   $\phi_8(\theta) = \text{sgn}(\sin \theta) \times |\tan \theta|^{1/\alpha}$
   $\phi_i(l\theta) = g(\phi_i(l\theta))$ for $1 \leq i \leq 8$
   where l is a natural number equal to or greater than 2
   $X_{++}$ represents a legion of x where $g(x) \geq 0$ and $x \geq 0$
   $X_{+-}$ represents a region of x where $g(x) < 0$ and $x \geq 0$
   $X_{-+}$ represents a region of x where $g(x) \geq 0$ and $x < 0$
   $X_{--}$ represents a region of x where $g(x) < 0$ and $x < 0$.

4. The device according to claim 3, wherein each of the plurality of said random variable output units comprises:
   a storage unit which stores a next random variable to be output;
   an output unit which outputs the random variable stored in said storage unit;
   a calculator which calculates a predetermined function for which the random variable stored in said storage unit is substituted; and
   an update unit which updates the value in said storage unit by replacing the value with a resultant value of said calculator.

5. The device according to claim 3, wherein said result output unit comprises:
   an integrated value storage unit which stores integrated values;
   an integrated value output unit which outputs the values stored in said integrated value storage unit as results of stochastic process;
   a sum calculator which add the value output by said normalizing unit to the value stored in said integrated value storage unit; and
   an update unit which updates the value in said integrated value storage unit by replacing the value with a value representing the sum calculated by said sum calculator.

6. The device according to claim 2, wherein each of the plurality of said random variable output units comprises:
- a storage unit which stores a next random variable to be output;
- an output unit which outputs the random variable stored in said storage unit;
- a calculator which calculates a predetermined function for which the random variable stored in said storage unit is substituted; and
- an update unit which updates the value in said storage unit by replacing the value with a resultant value of said calculator.

7. The device according to claim 2, wherein said result output unit comprises:
- an integrated value storage unit which stores integrated values;
- an integrated value output unit which outputs the values stored in said integrated value storage unit as results of stochastic process;
- a sum calculator which add the value output by said normalizing unit to the value stored in said integrated value storage unit; and
- an update unit which updates the value in said integrated value storage unit by replacing the value with a value representing the sum calculated by said sum calculator.

8. The device according to claim 1, wherein each of the plurality of said random variable output units comprises:
- a storage unit which stores a next random variable to be output;
- an output unit which outputs the random variable stored in said storage unit;
- a calculator which calculates a predetermined function for which the random variable stored in said storage unit is substituted; and
- an update unit which updates the value in said storage unit by replacing the value with a resultant value of said calculator.

9. The device according to claim 8, wherein said result output unit comprises:
- an integrated value storage unit which stores integrated values;
- an integrated value output unit which outputs the values stored in said integrated value storage unit as results of stochastic process;
- a sum calculator which add the value output by said normalizing unit to the value stored in said integrated value storage unit; and
- an update unit which updates the values in said integrated value storage unit by replacing the value with a value representing the sum calculated by said sum calculator.

10. The device according to claim 1, wherein each of the plurality of said random variable output units comprises:
- a storage unit which stores a next random variable to be output;
- an output unit which outputs the random variable stored in said storage unit;
- a calculator which calculates a predetermined function for which the random variable stored in said storage unit is substituted; and
- an update unit which updates the value in said storage unit by replacing the value with a resultant value of said calculator.

11. The device according to claim 1, wherein said result output unit comprises:
- an integrated value storage unit which stores integrated values;
- an integrated value output unit which outputs the values stored in said integrated value storage unit as results of stochastic process;
- a sum calculator which add the value output by said normalizing unit to the value stored in said integrated value storage unit; and
- an update unit which updates the value in said integrated value storage unit by replacing the value with a value representing the sum calculated by said sum calculator.

12. The device according to claim 1, wherein said result output unit comprises:
- an integrated value storage unit which stores integrated values;
- an integrated value output unit which outputs the values stored in said integrated value storage unit as results of stochastic process;
- a sum calculator which add the value output by said normalizing unit to the value stored in said integrated value storage unit; and
- an update unit which updates the value in said integrated value storage unit by replacing the value with a value representing the sum calculated by said sum calculator.

13. A method for outputting stochastic process comprising the steps of:
- outputting a plurality of random variable sequences whose limiting distribution obeys an explicit density function;
- normalizing the sum of the random variables in the same row over the random variable sequences output by said step of outputting the random variable sequences, and sequentially outputting normalized values; and
- integrating the values sequentially output by said step of outputting the normalized values, and sequentially outputting integrated values as result values in the stochastic process,
- and wherein each of the density functions of limiting distributions in the random variable sequences output by said step of outputting random variable output units is a function $\rho\ (\cdot)$ having the characteristics shown in equation 17;

$$\rho(x) \approx c_-|x|^{-(1+\alpha)} \text{ for } x \to -\infty$$
$$\rho(x) \approx c_+|x|^{-(1+\alpha)} \text{ for } x \to +\infty \qquad \text{EQUATION 17}$$

where
$0 < \alpha \leq 2$,
$0 \leq c_-$, and
$0 \leq c_+$.

14. The method according to claim 13, wherein the number of the sequences of the random variables is N, and
- said step of normalizing outputs a sequence "v(0), v(1), v(2), ..." of normalized values obtained by equation 18 when an i-th random variable sequence (where $1 \leq i \leq N$) is a sequence "x(i, 0), x(i, 1), x(i, 2), ..." of random variables, and
- said step of outputting result values outputs a sequence L(0), L(1), L(2), ... of result values obtained by equation 19;

$$v(t) = \frac{\sum_{i=1}^{N} x(i, t) - A}{B}$$ EQUATION 18 where

A=0, B=$N^{1/\alpha}$ for 0<$\alpha$≦1,

A=0, B=N for $\alpha$=1, $\bar{x}$=0,

A=$N^2 \overline{\sin x/N}$, B=N for $\alpha$=1, $\bar{x} \neq 0$,

A=$N\bar{x}$, B=$N^{1/\alpha}$ for 1<$\alpha$<2, and $\bar{x}$ is the expectation value of the random variable output x by the random variable output units.

$$L(t) = \sum_{j=0}^{t} v(j)$$ EQUATION 19

15. The method according to claim 14, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

16. The method according to claim 15, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

17. The method according to claim 14, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

18. The method according to claim 13, wherein each of the sequences x(i, 0), x(i, 1), x(i, 2) of random variables output said step of outputting the random variable sequences is obtained by a recurrence formula x(i, t+1)=f(x(i, t)) which utilizes a function f(·) obtained by equation 20;

$$f(x) = \begin{cases} \frac{1}{\delta_1} g(\delta_1 x) & \text{for } x \in X_{++} \\ \frac{1}{\delta_2} g(\delta_1 x) & \text{for } x \in X_{+-} \\ \frac{1}{\delta_1} g(\delta_2 x) & \text{for } x \in X_{-+} \\ \frac{1}{\delta_2} g(\delta_2 x) & \text{for } x \in X_{--} \end{cases}$$ EQUATION 20 where $\delta_1$>0, $\delta_2$>0 g(x) is a function defined by any one of the followings:
a step function sgn(x) satisfying the followings;
sgn(x)=1 for x>0
sgn(x)=−1 for x<0
any one of the following $\phi_1$ to $\phi_8$; and
$\phi_1(\theta)$=−sgn(tan $\theta$)/|tan $\theta$|$^{1/\alpha}$
$\phi_2(\theta)$=−sgn(tan $\theta$)×|tan $\theta$|$^{1/\alpha}$
$\phi_3(\theta)$=−sgn(cos $\theta$)/|tan $\theta$|$^{1/\alpha}$
$\phi_4(\theta)$=−sgn(cos $\theta$)×|tan $\theta$|$^{1/\alpha}$
$\phi_5(\theta)$=sgn(cos $\theta$)/|tan $\theta$|$^{1/\alpha}$
$\phi_6(\theta)$=sgn(cos $\theta$)×|tan $\theta$|$^{1/\alpha}$
$\phi_7(\theta)$=sgn(sin $\theta$)/|tan $\theta$|$^{1/\alpha}$
$\phi_8(\theta)$=sgn(sin $\theta$)×|tan $\theta$|$^{1/\alpha}$
$\phi_i(l\theta)$=g($\phi_i(l\theta)$) for 1≦i≦8 where l is a natural number equal to or greater than 2
$X_{++}$ represents a legion of x where g(x)≧0 and x≧0
$X_{+-}$ represents a region of x where g(x)<0 and x≧0
$X_{-+}$ represents a region of x where g(x)≧0 and x<0
$X_{--}$ represents a region of x where g(x)<0 and x<0.

19. The method according to claim 18, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

20. The method according to claim 19, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

21. The method according to claim 18, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

22. The method according to claim 13, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

23. The method according to claim 22, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

24. The method according to claim 14, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

25. The method according to claim 13, wherein said step of outputting the result values comprises the steps of:

outputting values stored in an integrated value storage unit storing integrated values as result values in the stochastic process;

calculating the sum of the value output by said step of normalizing and the value stored in said integrated value storage unit; and updating the value in said integrated value storage unit by replacing the value with the sum calculated by said calculation step.

26. A data processor readable data recording medium storing a program for outputting stochastic process, said program causes said data processor to execute the steps of:

outputting a plurality of random variable sequences whose limiting distribution obeys an explicit density function;

normalizing the sum of the random variables in the same row over the random variable sequences output by said step of outputting the random variable sequences, and sequentially outputting normalized values; and integrating the values sequentially output by said step of outputting the normalized values, and sequentially outputting integrated values as result values in the stochastic process, and wherein each of the density functions of limiting distributions in the random variable sequences output by said step of outputting random variable output units is a function $\rho(\cdot)$ having the characteristics shown in equation 21;

$$\rho(x) \approx c_- |x|^{-(1+\alpha)} \text{ for } x \to -\infty$$
$$\rho(x) \approx c_+ |x|^{-(1+\alpha)} \text{ for } x \to +\infty \quad \text{EQUATION 21}$$

where
$0 < \alpha \leq 2$,
$0 \leq c_-$, and
$0 \leq c_+$.

27. The data recording medium according to claim 26, wherein the number of the sequences of the random variables is N, and said step of normalizing outputs a sequence "v(0), v(1), v(2), ..." of normalized values obtained by equation 22 when an i-th random variable sequence (where $1 \leq i \leq N$) is a sequence "x(i, 0), x(i, 1), x(i, 2), ..." of random variables, and said step of outputting result values outputs a sequence L(0), L(1), L(2), ... of result values obtained by equation 23;

$$v(t) = \frac{\sum_{i=1}^{N} x(i, t) - A}{B} \quad \text{EQUATION 22}$$

where
A=0, B=$N^{1/\alpha}$ for $0 < \alpha \leq 1$,
A=0, B=N for $\alpha=1$, $\bar{x}=0$,
A=$N^2 \sin \bar{x}/N$, B=N for $\alpha=1$, $\bar{x} \neq 0$,
A=N$\bar{x}$, B=$N^{1/\alpha}$ for $1 < \alpha < 2$, and
$\bar{x}$ is the expectation value of the random variable output x by the random variable output units.

$$L(t) = \sum_{j=0}^{t} v(j) \quad \text{EQUATION 23}$$

28. The data recording medium according to claim 27, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

29. The data recording medium according to claim 28, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

30. The data recording medium according to claim 29, wherein said data recording medium is a compact disc, a floppy disk, a hard disk, a magneto-optical disk, a digital versatile disc, a magnetic tape, or a semiconductor memory.

31. The data recording medium according to claim 28, wherein said data recording medium is a compact disc, a floppy disk, a hard disk, a magneto-optical disk, a digital versatile disc, a magnetic tape, or a semiconductor memory.

32. The data recording medium according to claim 27, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

33. The data recording medium according to claim 32, wherein said data recording medium is a compact disc, a floppy disk, a hard disk, a magneto-optical disk, a digital versatile disc, a magnetic tape, or a semiconductor memory.

34. The data recording medium according to claim 29, wherein said data recording medium is a compact disc, a floppy disk, a hard disk, a magneto-optical disk, a digital versatile disc, a magnetic tape, or a semiconductor memory.

35. The data recording medium according to claim 26, wherein each of the sequences x(i, 0), x(i, 1), x(i, 2) of random variables output said step of outputting the random variable sequences is obtained by a recurrence formula x(i, t+1)=f(x(i, t)) which utilizes a function f(·) obtained by equation 24;

$$f(x) = \begin{cases} \frac{1}{\delta_1} g(\delta_1 x) \text{ for } x \in X_{++} \\ \frac{1}{\delta_2} g(\delta_1 x) \text{ for } x \in X_{+-} \\ \frac{1}{\delta_1} g(\delta_2 x) \text{ for } x \in X_{-+} \\ \frac{1}{\delta_2} g(\delta_2 x) \text{ for } x \in X_{--} \end{cases} \quad \text{EQUATION 24}$$

where $\delta_1 > 0$, $\delta_2 > 0$ g(x) is a function defined by any one of the followings:
a step function sgn(x) satisfying the followings;
sgn(x)=1 for x>0
sgn(x)=−1 for x<0
any one of the following $\phi_1$ to $\phi_8$; and
$\phi_1(\theta) = -\text{sgn}(\tan \theta)/|\tan \theta|^{1/\alpha}$
$\phi_2(\theta) = -\text{sgn}(\tan \theta) \times |\tan \theta|^{1/\alpha}$
$\phi_3(\theta) = -\text{sgn}(\cos \theta)/|\tan \theta|^{1/\alpha}$
$\phi_4(\theta) = -\text{sgn}(\cos \theta) \times |\tan \theta|^{1/\alpha}$
$\phi_5(\theta) = \text{sgn}(\cos \theta)/|\tan \theta|^{1/\alpha}$
$\phi_6(\theta) = \text{sgn}(\cos \theta) \times |\tan \theta|^{1/\alpha}$
$\phi_7(\theta) = \text{sgn}(\sin \theta)/|\tan \theta|^{1/\alpha}$
$\phi_8(\theta) = \text{sgn}(\sin \theta) \times |\tan \theta|^{1/\alpha}$
$\phi_i(l\theta) = g(\phi_i(l\theta))$ for $1 \leq i \leq 8$
where l is a natural number equal to or greater than 2
$X_{++}$ represents a legion of x where g(x)≧0 and x≧0
$X_{+-}$ represents a region of x where g(x)<0 and x≧0
$X_{-+}$ represents a region of x where g(x)≧0 and x<0
$X_{--}$ represents a region of x where g(x)<0 and x<0.

36. The data recording medium according to claim 35, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

37. The data recording medium according to claim 36, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

38. The data recording medium according to claim 37, wherein said data recording medium is a compact disc, a floppy disk, a hard disk, a magneto-optical disk, a digital versatile disc, a magnetic tape, or a semiconductor memory.

39. The data recording medium according to claim 36, wherein said data recording medium is a compact disc, a floppy disk, a hard disk, a magneto-optical disk, a digital versatile disc, a magnetic tape, or a semiconductor memory.

40. The data recording medium according to claim 35, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

41. The data recording medium according to claim 40, wherein said data recording medium is a compact disc, a floppy disk, a hard disk, a magneto-optical disk, a digital versatile disc, a magnetic tape, or a semiconductor memory.

42. The data recording medium according to claim 35, wherein said data recording medium is a compact disc, a floppy disk, a hard disk, a magneto-optical disk, a digital versatile disc, a magnetic tape, or a semiconductor memory.

43. The data recording medium according to claim 28, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

44. The data recording medium according to claim 43, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

45. The data recording medium according to claim 44, wherein said data recording medium is a compact disc, a floppy disk, a hard disk, a magneto-optical disk, a digital versatile disc, a magnetic tape, or a semiconductor memory.

46. The data recording medium according to claim 43, wherein said data recording medium is a compact disc, a floppy disk, a hard disk, a magneto-optical disk, a digital versatile disc, a magnetic tape, or a semiconductor memory.

47. The data recording medium according to claim 26, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

48. The data recording medium according to claim 47, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

49. The data recording medium according to claim 48, wherein said data recording medium is a compact disc, a floppy disk, a hard disk, a magneto-optical disk, a digital versatile disc, a magnetic tape, or a semiconductor memory.

50. The data recording medium according to claim 47, wherein said data recording medium is a compact disc, a floppy disk, a hard disk, a magneto-optical disk, a digital versatile disc, a magnetic tape, or a semiconductor memory.

51. The data recording medium according to claim 28, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

52. The data recording medium according to claim 51, wherein said data recording medium is a compact disc, a floppy disk, a hard disk, a magneto-optical disk, a digital versatile disc, a magnetic tape, or a semiconductor memory.

53. The data recording medium according to claim 26, wherein said step of outputting the random variable sequences comprises the steps of:

outputting values stored in a plurality of storage units each storing a next random variable to be output;

calculating a predetermined function for which the random variables stored in the plurality of said storage units are substituted; and updating the values in the plurality of said storage units by replacing the values with resultant values of said calculation step.

54. The data recording medium according to claim 53, wherein said data recording medium is a compact disc, a floppy disk, a hard disk, a magneto-optical disk, a digital versatile disc, a magnetic tape, or a semiconductor memory.

55. The data recording medium according to claim 28, wherein said data recording medium is a compact disc, a floppy disk, a hard disk, a magneto-optical disk, a digital versatile disc, a magnetic tape, or a semiconductor memory.

56. The data recording medium according to claim 26, wherein said data recording medium is a compact disc, a floppy disk, a hard disk, a magneto-optical disk, a digital versatile disc, a magnetic tape, or a semiconductor memory.

* * * * *